(12) United States Patent
Cassel et al.

(10) Patent No.: US 7,329,869 B2
(45) Date of Patent: Feb. 12, 2008

(54) CAMERA SYSTEM

(75) Inventors: Anders Cassel, Goleta, CA (US);
Frank Paul Leonelli, Jr., Goleta, CA (US); Marcel Tremblay, Goleta, CA (US); Joseph Kostrzewa, Buellton, CA (US)

(73) Assignees: Autoliv Development AB, Vargarda (SE); Flir Systems, Inc., Wilsonville, OR (US)

( * ) Notice: Subject to any disclaimer, the term of this patent is extended or adjusted under 35 U.S.C. 154(b) by 0 days.

(21) Appl. No.: 11/225,419

(22) Filed: Sep. 13, 2005

(65) Prior Publication Data
US 2007/0069134 A1 Mar. 29, 2007

(51) Int. Cl.
*G01J 5/02* (2006.01)
(52) U.S. Cl. .................... 250/339.03; 250/352
(58) Field of Classification Search .......... 250/339.03, 250/352

See application file for complete search history.

(56) References Cited

U.S. PATENT DOCUMENTS

| 5,729,016 A * | 3/1998 | Klapper et al. ............. 250/334 |
| 6,515,285 B1 * | 2/2003 | Marshall et al. ............ 250/352 |
| 6,892,030 B2 * | 5/2005 | Rife ........................... 396/535 |

* cited by examiner

*Primary Examiner*—David Porta
*Assistant Examiner*—Mark R Gaworecki
(74) *Attorney, Agent, or Firm*—Brinks Hofer Gilson & Lione (57) ABSTRACT

A camera system exhibiting reduced effects from temperature changes. The camera system includes an IR sensor; an optical arrangement adapted to focus incoming light onto the sensor; a processing arrangement adapted to process signals produced by the sensor; a heatsink in thermal contact with and is adapted to transfer heat energy away from, the processing arrangement; and a thermal equalizer. The thermal equalizer at least partially surrounds and is in thermal contact with the optics/sensor unit and is formed at least partially from a material having a high thermal conductivity. The thermal equalizer conducts heat energy from warmer to cooler parts of the optics/sensor unit. The thermal equalizer is also thermally insulated from ambient air surrounding the camera system and from the heatsink.

14 Claims, 4 Drawing Sheets

CAMERA SYSTEM

BACKGROUND OF THE INVENTION

1. Field of the Invention

This invention relates to a camera system, and in particular concerns infrared (IR) camera systems which may be used in environments where the ambient temperature is likely to fluctuate rapidly.

2. Prior Technology

Fluctuations in temperature raise problems for imaging devices, in particular IR imaging devices, and if temperature gradients exist within the optical systems and the sensor of an IR camera, this can lead to significant deterioration of the image produced by the camera.

Some modern motor vehicles include an IR camera which is located under the bonnet of the vehicle, with the field of view of the camera pointing forwardly of the vehicle. Normally the camera is used to display an image of the scenery in front of the driver. This image will help the driver to see, particularly in the case of relatively warm objects (such as pedestrians), in dark conditions. The image from the camera could also be processed to identify and mark objects that should be observed by the driver. Clearly, accurate readings are needed from the IR camera for such a system to function effectively.

The ambient temperature under the bonnet of a motor vehicle is, however, liable to fluctuate significantly during the course of a journey. For instance, when the vehicle is idling the temperature under the bonnet may reach 60° C. When driving at a moderate speed, however, the temperature under the bonnet may drop to that of the ambient air (e.g. 20° C.).

Many IR cameras include a processing arrangement, which will generally comprise one or more integrated circuits, and this processing arrangement may generate a significant quantity of heat. To counter this, it is common to provide a heatsink which is in thermal contact with the processing arrangement, and which conducts heat energy from the processing arrangement to the surroundings of the camera.

It will be appreciated, however, that when the temperature of the camera surroundings reaches a high level, for instance when the vehicle is idling, the heatsink will then conduct heat energy from the surroundings into the camera.

These effects are likely to cause temperature gradients within and around the optical systems and the sensor of the camera, as well as raising and lowering the overall temperature of the optical systems and the sensor rapidly. It will be appreciated that this will tend to deteriorate the quality of the images that are captured by the camera.

The manner in which heat is generated within, or transferred to, the camera system may lead to constant and predictable thermal gradients within the camera system. Such constant gradients, however, can be accommodated by making systematic adjustments, for example by incorporating a consistent weighting into the way in which the signals from the camera system are interpreted. However, more random, unpredictable gradients and overall changes in temperature cannot be accommodated in the same way.

It is an object of the present invention to seek to ameliorate one or more of the above problems.

SUMMARY OF THE INVENTION

Accordingly, one aspect of the present invention provides a camera system comprising: an IR sensor; an optical arrangement adapted to focus incoming light onto the sensor, the sensor and the optical arrangement together forming an optics/sensor unit; a processing arrangement adapted to process signals produced by the sensor; a heatsink which is in thermal contact with, and is adapted to transfer heat energy away from, the processing arrangement; and a thermal equalizer, formed at least partially from a material having a high thermal conductivity, which at least partially surrounds, and is in thermal contact with, the optics/sensor unit and is operable to conduct heat energy from warmer to cooler parts of the optics/sensor unit, the thermal equalizer being thermally insulated from ambient air surrounding the camera system and from the heatsink.

Advantageously, the thermal equalizer is thermally insulated from ambient air surrounding the camera system by means of a layer of air which at least partially surrounds the thermal equalizer.

Preferably, the layer of air is enclosed within an outer housing.

Conveniently, the thermal equalizer is thermally insulated from the heatsink by means of an insulating layer provided between the thermal equalizer and the heatsink.

Advantageously, the thermal equalizer comprises a substantially planar plate portion which is in thermal contact with the IR sensor.

Preferably, the thermal equalizer further comprises a substantially cylindrical, hollow protrusion which at least partly surrounds the optical arrangement, and is in thermal contact with the plate portion of the thermal equalizer.

Conveniently, the heatsink comprises a substantially planar sheet of material.

Advantageously, the heatsink further comprises a lip which extends from the edges of the sheet at approximately right-angles thereto.

Preferably, the thermal conductivity of a material from which the thermal equalizer is formed is equal to or higher than that of zinc.

Advantageously, the thermal equalizer is at least partially formed from a material having a high specific heat capacity.

Conveniently, the specific heat capacity of a material from which the thermal equalizer is formed is equal to or higher than that of zinc.

Advantageously, the camera system further comprises an external housing having front and rear parts, the front part containing the optics/sensor system and the thermal equalizer, and the rear part containing the processing electronics.

Preferably, the front and rear parts of the external housing are separated by the heatsink.

Conveniently, a part of the heatsink forms part of the outer surface of the camera system, the part of the heatsink separating the front and rear parts of the external housing.

Another aspect of the present invention provides a vehicle comprising a camera system according to the above.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE INVENTION

Figure 1:
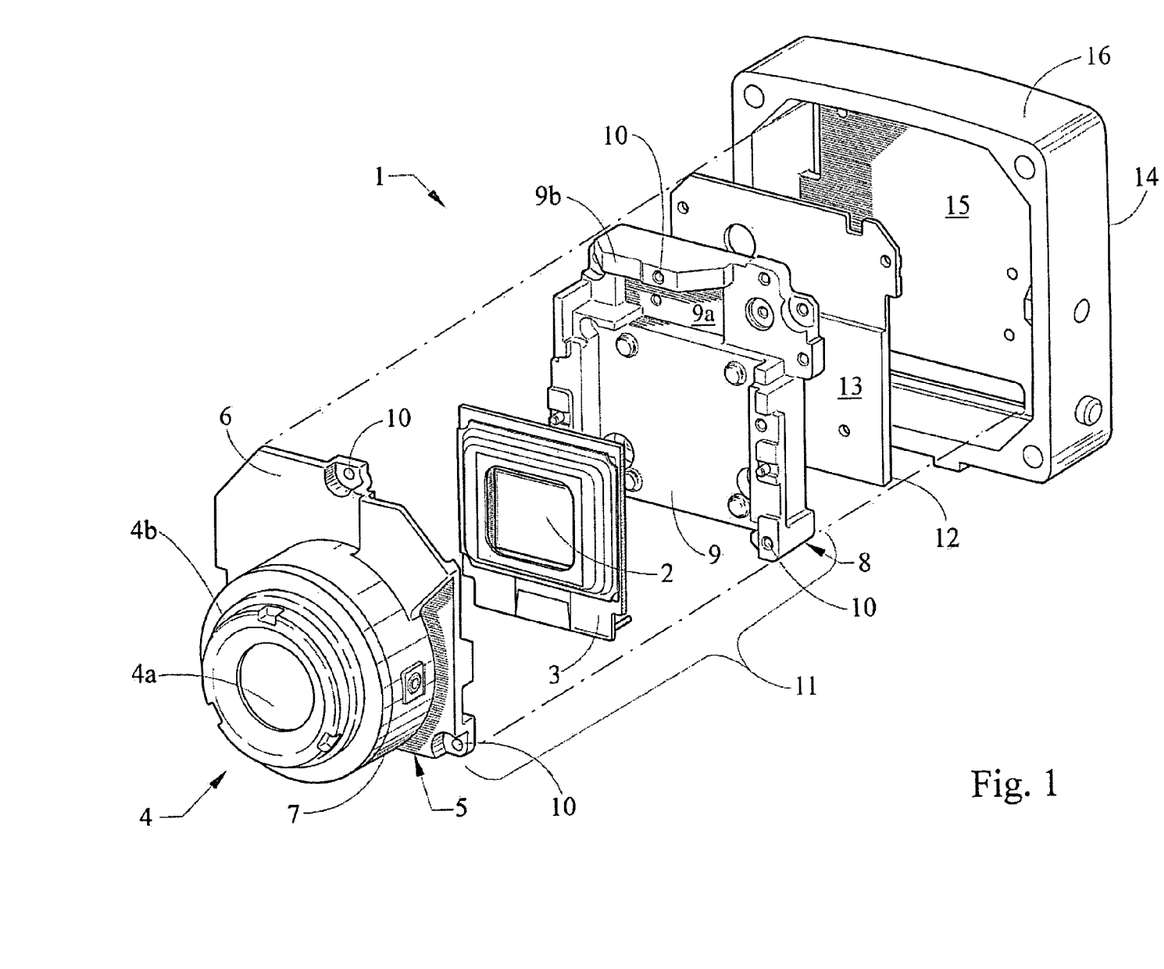
FIGS. 1 and 2 show exploded views of components of a camera system embodying the present invention.
Figure 2:
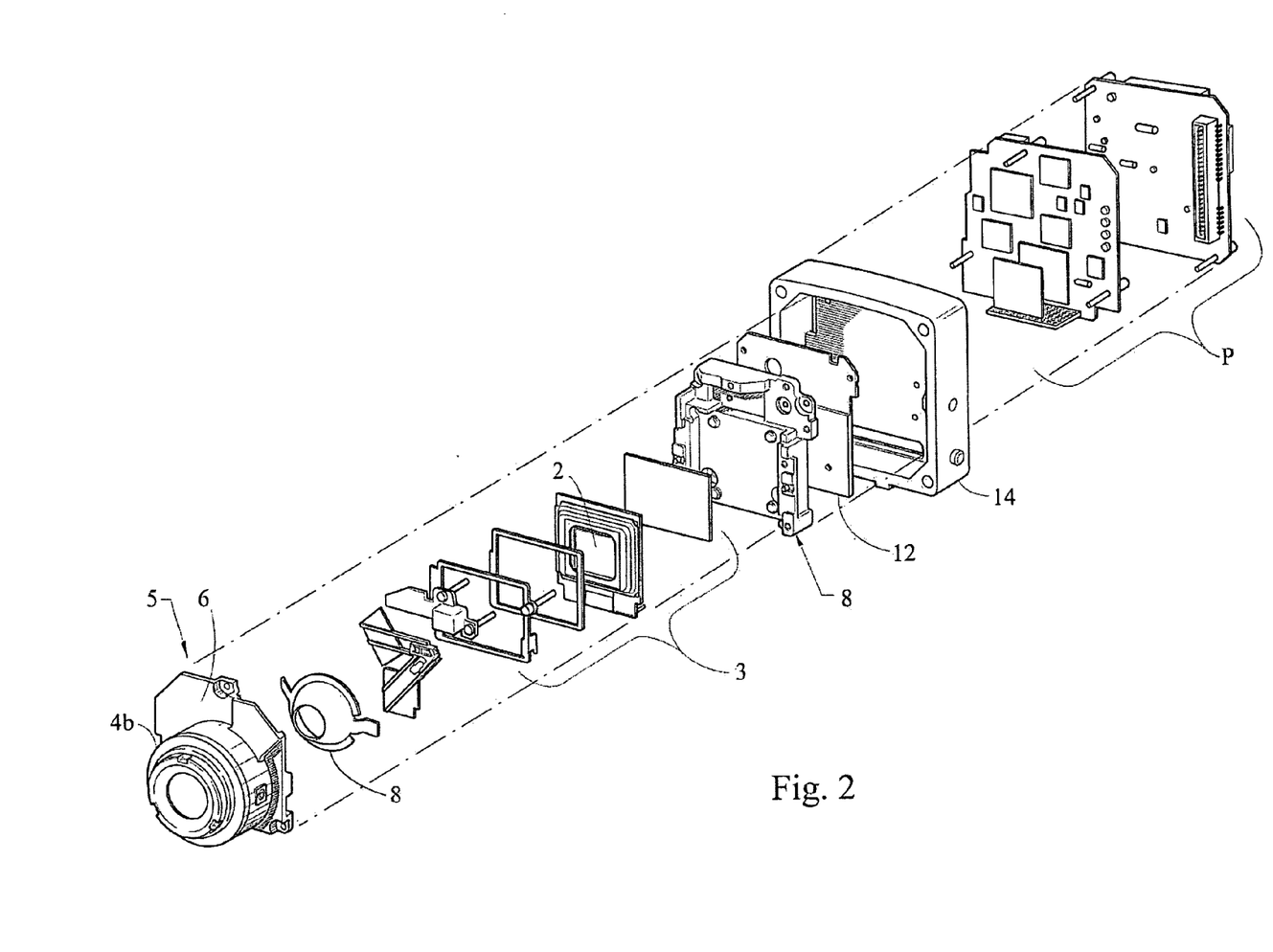

Referring firstly to FIGS. 1 and 2, a number of components of a camera system 1 embodying the present invention are shown. FIGS. 1 and 2 are "exploded" views, showing the components with exaggerated separation from one another. The system 1 comprises a sensor 2, which includes a detector array of bolometers sensitive to IR radiation. The sensor 2 is provided on a mounting 3, to allow the sensor 2 to be connected to, and registered in the correct position with respect to, other components of the camera system 1.

The camera system 1 further comprises an optical arrangement 4, which is adapted to focus incoming light onto the sensor. The optical arrangement 4 may comprise a number of lenses and/or mirrors, as will be understood by a person of skill in the art, and is the present embodiment comprises first and second lenses 4a, mounted in a generally cylindrical optical arrangement housing 4b as will be described in greater detail below. The sensor 2 and the optical arrangement 4 together make up a sensor/optics system of the camera system 1.

A rear part of the optical arrangement housing 4b is housed in a forward thermal equalizing member 5, which comprises a substantially planar plate 6 having a substantially circular aperture therethrough, with a substantially cylindrical, hollow protrusion 7 projecting therefrom and surrounding the aperture. In preferred embodiments of the invention, the optical arrangement housing 4b and the substantially cylindrical protrusion 7 are configured so that the optical arrangement housing 4b may be attached to the inside of the substantially cylindrical protrusion 7, for instance by a snap-fit arrangement, or by co-operating screw-threads.

A rear surface of the plate 6 of the forward thermal equalizing member 5 is formed so that the support 3 of the sensor 2 may be registered thereagainst, so that the sensor 2 is correctly positioned and aligned with respect to the optical arrangement 4, with the aperture in the plate allowing incoming light to pass through the optical arrangement 4 and impinge upon the sensor 2. As shown in FIG. 2, a baffle B is provided to block stray light from impinging on the sensor 2.

The camera system 1 further comprises a rear thermal equalizing member 8. The rear thermal equalizing member 8 comprises a substantially planar plate portion 9, which is slightly larger than the support 3 of the sensor 2. A front surface of the plate portion 9 of the rear thermal equalizing member 8 is formed so that a rear part of the support 3 of the sensor 2 may be registered thereagainst, with all or substantially all of the sensing area of the sensor 2 being in thermal contact with the plate portion 9. A thermally-conductive paste may be applied between these components to ensure that a good thermal contact is made.

Provided immediately above the sensor 2 (not shown in FIG. 1) are subsidiary processing electronics which receive signals output directly from the sensor 2 and convert the signals into an appropriate form for processing. Accordingly, an upper part of the rear thermal equalizing member 8 defines a recess 9a, above the plate portion 9 of the rear thermal equalizing member, which may accommodate the subsidiary processing electronics. The upper part 9b of the rear thermal equalizing member extends over the top of the recess 9a and extends forwardly of the plate portion 9.

Further, co-operating attachment means are provided on the front and rear thermal equalizing members 5, 8, to allow these elements to be attached to one another. In the example depicted in FIG. 1, these co-operating attachment means comprise corresponding holes or bores 10 provided around the edges of the plate portions 6, 9 of the forward and rear thermal equalizing members 5, 8 which, when aligned, allow bolts to pass therethrough to secure the front and rear thermal equalizing members 5, 8 together so that they are in thermal contact with one another, to form a thermal equalizer 11.

Co-operating projections are provided at the edges of the plate portions 6, 9 of the forward and rear thermal equalizing members 5, 8, which fit together when the forward and rear thermal equalizing members 5, 8 are fitted to one another and provide an increased contact surface area between these components, thus facilitating the transfer of heat energy therebetween.

The arrangement of these components is such that a front part of the support 3 of the sensor 2 may be registered with the rear of the forward thermal equalizing member 5, and the rear thermal equalizing member 8 may then be registered against the rear of the support 3 of the sensor 2, and the front and rear equalizing members 5, 8 may then be attached to one another, so that they substantially enclose the sensor 2 and form the thermal equalizer 11.

The thermal equalizer 11 is at least partially (and preferably wholly) formed from a material which has a high thermal conductivity. Advantageously, the material from which the thermal equalizer is formed also has a high specific heat capacity. For instance, the thermal equalizer may be formed from zinc. In preferred embodiments of the invention, the thermal conductivity and the specific heat capacity of the material forming the thermal equalizer are at least that of zinc. It is envisaged that the thermal equalizer may be formed from more than one material, and in such embodiments one of the materials may have a high thermal conductivity, with another of the materials having a high specific heat capacity. Preferably, the material having a high thermal conductivity will be placed directly in contact with parts of the sensor/optics system When the thermal equalizer 11 and the optical arrangement 4 are attached to one another in the manner described above, the thermal equalizer 11 is in thermal contact with the sensor 2 and with the optical arrangement 4, and is therefore able to conduct heat energy quickly between various parts of the sensor 2 and the optical arrangement 4. A skilled person will appreciate that this will have the effect of swiftly dissipating thermal gradients which may arise within the sensor/optics system.

The camera system 1 further includes processing electronics P (shown in FIG. 2), to process the signal which is output by the sensor 2. Further components to accommodate these processing electronics P will now be described.

Adjacent the rear thermal equalizing member 8 is provided a thermal insulator 12, which comprises an approximately rectangular, substantially planar sheet of a material having a low thermal conductivity, such as a plastics or resin material. A preferred material for the thermal insulator 12 is nylon. A first face 13 of the thermal insulator 12 is shaped to conform closely to the rear surface of the rear thermal equalizing member 8, and is placed thereagainst.

The camera system 1 further includes a heatsink 14. The heatsink 14 comprises a substantially planar sheet 15 of material which is approximately square in shape, with a forward-projecting lip 16 which extends from the edges of the sheet 15 at right-angles thereto. It will be appreciated that the heatsink 14 therefore takes the form of an approximately square, shallow dish.

The heatsink 14 is arranged so that a forward surface of the planar sheet 15 thereof rests against a rear surface of the thermal insulator 12, and the lip 16 of the heatsink 14 projects forwardly around the edges of the thermal insulator 12. It will be appreciated that the thermal insulator 12 acts to prevent, to a large extent, heat energy from passing between the heatsink 14 and the rear thermal equalizing member 8.

The processing electronics P are provided adjacent a rear surface of the planar sheet 15 of the heatsink 14, and are in thermal contact therewith. Once again a thermally-conductive paste may be provided between these components, to ensure that a good thermal contact is made. It will therefore be appreciated that the heatsink 14 has the effect of conducting heat energy rapidly and efficiently away from the processing electronics P, but will not (due to the presence of the thermal insulator 12) pass this heat energy on to the thermal equalizer 11. Small apertures are provided in the thermal insulator 12 and the heatsink 14 to allow a wire to pass between the subsidiary processing electronics and the processing electronics P, so that information from the sensor 2 may be communicated to the processing electronics P.

The heatsink 14 is formed from a material which has a relatively low specific heat capacity but a high thermal conductivity, for instance aluminium.

Figure 3:
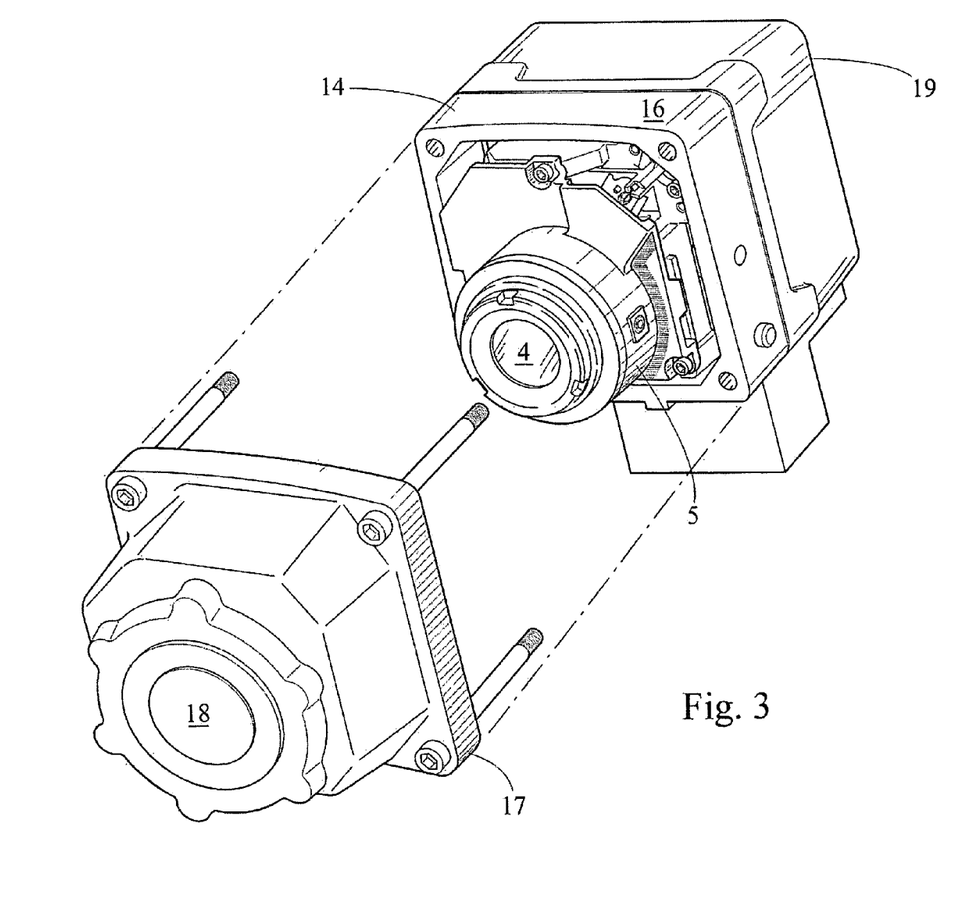
FIG. 3 shows a further view of components of a camera system embodying the present invention.

Turning to FIG. 3, the camera system 1 is shown in a more advanced state of assembly. A front housing 17 is attached to a forward edge of the lip 16 of the heatsink 13, and surrounds the thermal equalizer 11 and optical system 4. A window 18 is provided on a front surface of the front housing 17, to allow light to pass therethrough and impinge upon the optical system 4.

When the front housing 17 is attached to the heatsink 14 in this manner, a layer of air surrounds the thermal equalizing member 11, effectively providing thermal insulation between the thermal equalizing member 11 and the ambient air surrounding the camera system 1. In alternative embodiments of the invention, a layer of a solid thermal insulating material may be provided within the space between the thermal equalizer 11 and the front housing 17 of the camera system 1.

A rear housing 19 is attached to a rear surface of the heatsink 14, and the rear housing 19 surrounds the processing electronics P of the camera system 1. The front and rear housings 17, 19 are preferably formed from magnesium.

It will therefore be appreciated that the outer surface of the camera system 1 is provided by the front housing 17, the heatsink 14 and the rear housing 19. The front housing 17 provides the outer surface of the front of the camera system 1, the walls of the lip 16 of the heatsink 14 provide a middle section of the outer surface of the camera system 1, and the rear housing 19 provides the outer surface of the rear section of the camera system 1. A relatively large section of the surface area of the heatsink 14 is therefore exposed to the surrounding air, and this will assist in allowing the heatsink 14 to transfer heat energy away from the processing electronics P to the surroundings of the camera system 1.

Figure 4:
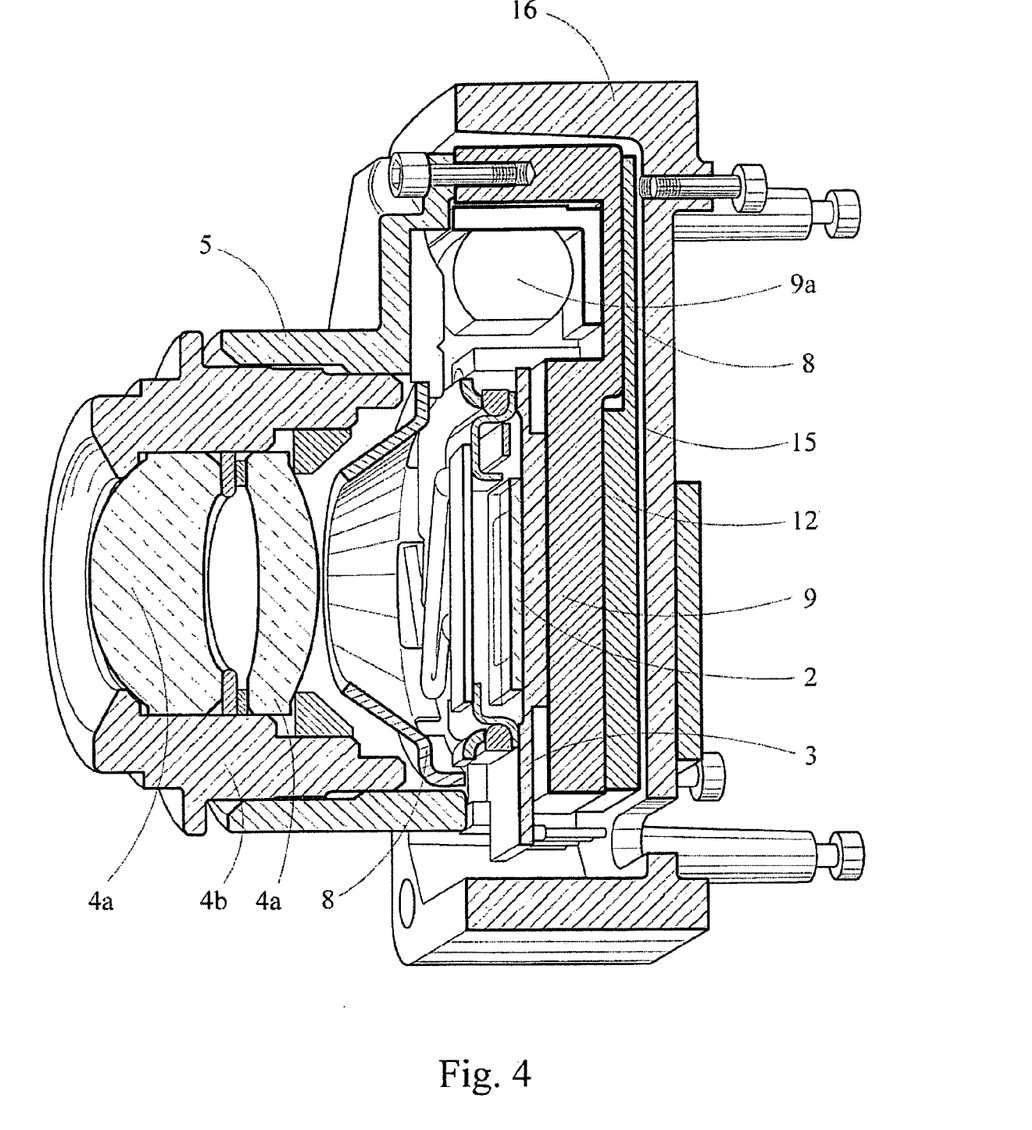
FIG. 4 shows a cut-away view of part of a camera system embodying the present invention.

FIG. 4 shows a cutaway view of components of the camera system 1 when assembled, with the front and rear housings 17, 19 being omitted. Here, it can clearly be seen that the thermal equalizer 11, composed of the front and rear thermal equalizing members 5, 8, provides a path to allow thermal energy to be rapidly exchanged between parts of the optics/sensor system of the camera system 1. The subsidiary electronics are all shown schematically as a white circle, retained within the recess 9a of the rear thermal equalizing member 8.

It will be appreciated that the high thermal conductivity of the thermal equalizer 11 will act to dissipate rapidly any thermal gradients which occur within the options/sensor unit of the camera system 1. The high specific heat capacity of the thermal equalizer 11 will also provide resistance against rapid fluctuations in temperature. For instance, if the temperature surrounding the thermal equalizer 11 rises rapidly, the temperature of the thermal equalizer itself (which is in thermal contact with the optical arrangement 4 and the sensor 2) will rise relatively slowly, thus ensuring that the overall temperature of the optics/sensor unit does not fluctuate too rapidly.

The thermal equalizer 11 at least partially surrounds the optical arrangement and the sensor, and this assists both in ensuring that the thermal equalizer is in contact with a large number of parts of the optics/sensor unit, and in increasing the thermal "buffering" effect which the thermal equalizer 11 provides.

The thermal insulation which is provided between the thermal equalizer 11 and the ambient air surrounding the camera system 1 will also provide a further layer of protection against rapid fluctuations in overall temperature of the optics/sensor unit.

It will, therefore, be appreciated that embodiments of the invention provide a camera system whose performance is resistant to deterioration under large, rapid and unpredictable fluctuations in ambient temperature.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The following claims are presented in a singly-dependent format to comply with requirements imposed by the US Patent and Trademark Office. However, this is not to be interpreted as limiting the manner in which the features recited in the claims may be combined with one another. In particular, it should be understood that any of the claims may in general be made dependent upon any or all of the preceding claims.

The invention claimed is:

1. A camera system comprising:
    an IR sensor;
    an optical arrangement adapted to focus incoming light onto the sensor, the sensor and the optical arrangement together forming an optics/sensor unit;
    a processing arrangement configured to process signals produced by the sensor;
    a heatsink which is in thermal contact with, and is adapted to transfer heat energy away from, the processing arrangement; and
    a thermal equalizer, formed at least partially from a material having a high thermal conductivity, which at least partially surrounds, and is in thermal contact with, the optics/sensor unit and is operable to conduct heat energy from warmer to cooler parts of the optics/sensor unit,
    the thermal equalizer being thermally Insulated from ambient air surrounding the camera system and from the heatsink.

2. A camera system according claim 1, wherein the thermal equalizer is thermally insulated from ambient air surrounding the camera system by means of a layer of air which at least partially surrounds the thermal equalizer.

3. A camera system according to claim 2, wherein the layer of air is enclosed within an outer housing.

4. A camera system according to claim 1, wherein the thermal equalizer is thermally insulated from the heatsink by means of an insulating layer provided between the thermal equalizer and the heatsink.

5. A camera system according to claim 1, wherein the heatsink comprises a substantially planar sheet of material.

6. A camera system according to claim 5, wherein the heatsink further comprises a lip which extends from the edges of the sheet at approximately right-angles thereto.

7. A camera system according to claim 1, further comprising an external housing having front and rear parts, the front part containing the optics/sensor system and the thermal equalizer, and the rear part containing the processing electronics.

8. A camera system according to claim 7, wherein the front and rear parts of the external housing are separated by the heatsink.

9. A camera system according to claim 8, wherein a part of the heatsink forms part of the outer surface of the camera system, the part of the heatsink separating the front and rear parts of the external housing.

10. A vehicle comprising a camera system according to claim 1.

11. A camera system comprising:
an IR sensor;
an optical arrangement adapted to focus incoming light onto the sensor, the sensor and the optical arrangement together forming an optics/sensor unit;
a processing arrangement adapted to process signals produced by the sensor;
a heatsink which is in thermal contact with, and is adapted to transfer heat energy away form, the processing arrangement; and
a thermal eguazlizer, formed at least partially from a material having a high thermal conductivity, which at least partially surrounds, and is in thermal contact with, the optics/sensor unit and is operable to conduct heat energy from warmer to cooler parts of the optics/sensor unit, the thermal equalizer including a substantially planar plate portion which is in thermal contact with the IR sensor, the thermal equalizer being thermally insulated from ambient air surrounding the camera system and from the heatslnk.

12. A camera system according to claim 11, wherein the thermal equalizer further comprises a substantially cylindrical, hollow protrusion which at least partly surrounds the optical arrangement, and is in thermal contact with the plate portion of the thermal equalizer.

13. A camera system comprising:
an IR sensor;
an optical arrangement adapted to focus incoming light onto the sensor, the sensor and the optical arrangement together forming an optics/sensor unit;
a processing arrangement adapted to process signals produced by the sensor;
a heatsink which is in thermal contact with, and is adapted to transfer heat energy away from, the processing arrangement; and
a thermal equalizer, formed at least partially from a material having a thermal conductivity that is equal to or higher than that of zinc, which at least partially surrounds, and is in thermal contact with, the optics/sensor unit and is operable to conduct heat energy from warmer to cooler parts of the optics/sensor unit, the thermal equalizer being thermally insulated from ambient air surrounding the camera system and from the heatsink.

14. A camera system comprising:
an IR sensor
an optical arrangement adapted to focus incoming light onto the sensor, the sensor and the optical arrangement together forming an optics/sensor unit;
a processing arrangement adapted to process signals produced by the sensor;
a heatsink which is in thermal contact with, and is adapted to transfer heat energy away from, the processing arrangement; and
a thermal equalizer, formed at least partially from a material having a high thermal conductivity which at least partially surrounds, and is in thermal contact with, the optics/sensor unit and is operable to conduct heat energy from warmer to cooler parts of the optics/sensor unit,
the thermal equalizer being thermally insulated from ambient air surrounding the camera system and from the heatsink; and
wherein the thermal equalizer is at least partially formed from a material having a specific heat capacity which is equal to or higher than that of zinc.

* * * * *

UNITED STATES PATENT AND TRADEMARK OFFICE
CERTIFICATE OF CORRECTION

| | |
|---|---|
| PATENT NO. | : 7,329,869 B2 |
| APPLICATION NO. | : 11/225419 |
| DATED | : February 12, 2008 |
| INVENTOR(S) | : Anders Cassel et al. |

It is certified that error appears in the above-identified patent and that said Letters Patent is hereby corrected as shown below:

In column 6, Claim 1, change "Insulated" to --insulated--.

In column 7, Claim 11, change "form" to --from--.

In column 8, Claim 14, insert --,-- after "sensor".

In column 8, Claim 14, insert --,-- after "conductivity".

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,329,869 B2  
APPLICATION NO. : 11/225419  
DATED : February 12, 2008  
INVENTOR(S) : Anders Cassel et al.

Page 1 of 1

It is certified that error appears in the above-identified patent and that said Letters Patent is hereby corrected as shown below:

In column 6, Claim 1 line 65, change "Insulated" to --insulated--.

In column 7, Claim 11 line 38, change "form" to --from--.

In column 8, Claim 14 line 28, insert --,-- after "sensor".

In column 8, Claim 14 line 37, insert --,-- after "conductivity".

This certificate supersedes the Certificate of Correction issued July 29, 2008.

Signed and Sealed this

Twenty-sixth Day of August, 2008

JON W. DUDAS  
*Director of the United States Patent and Trademark Office*